Nov. 21, 1933. W. C. LAUGHLIN 1,935,642
CLARIFIER
Filed June 6, 1929 2 Sheets-Sheet 1

Inventor
William C. Laughlin
By his Attorney
Albert M. Austin

Nov. 21, 1933.  W. C. LAUGHLIN  1,935,642
CLARIFIER
Filed June 6, 1929  2 Sheets-Sheet 2
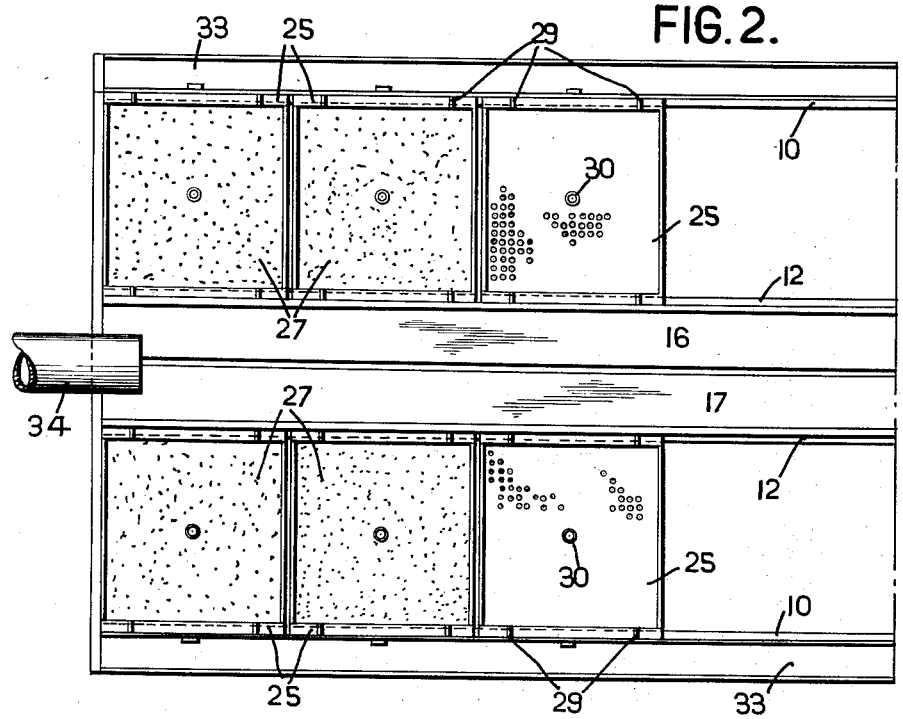
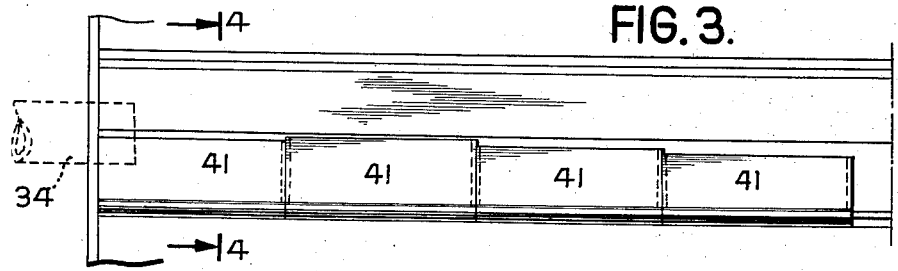
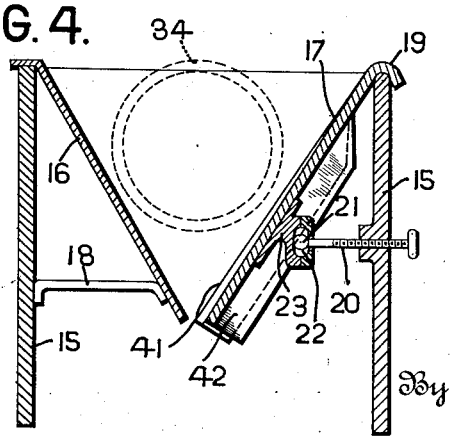
Inventor
William C. Laughlin
By his Attorney
Albert M. Austin Patented Nov. 21, 1933

1,935,642

UNITED STATES PATENT OFFICE 1,935,642

CLARIFIER

William C. Laughlin, Glendale, Calif., assignor, by mesne assignments, to Filtration Equipment Corporation, New York, N. Y., a corporation of Delaware Application June 6, 1929. Serial No. 368,836

14 Claims. (Cl. 210—45)

This invention relates to thickeners or clarifiers for removing suspended matter from a liquid.

The invention relates specifically to apparatus in which the liquid is passed through a clarifying medium capable of removing the suspended material and provides for passing the liquid through the clarifying medium in an upward direction.

The invention further provides for the cleaning of the clarifying medium without interrupting the continuous operation of the clarifier.

The invention is applicable to various processes in which it is desired to separate fine suspended matter from a liquid, such as for thickening concentrates, removing suspended matter from waste water to prevent the pollution of streams, treatment of sewage, thickening pulps, demulsifying oils, etc. It will be described, however, for purposes of illustration as applied to an apparatus for separating and removing suspended matter from sewage.

This is accomplished in accordance with the present invention by providing a tank in which the material is caused to flow downwardly toward a sludge hopper and thence upwardly through the clarifying medium where the unsettled solid particles are separated and fall to the sludge hopper. The clear liquid is removed after having passed through the clarifying medium.

Provision is made for selectively rendering portions of the clarifying medium inoperative for cleaning purposes and for preventing overflow of the unclarified liquid during the cleaning operation.

Provision is also made for distributing the flow of liquid and solid mixture into the clarifier whereby the flow may be distributed equally over the settling area of the containing receptacle.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a transverse section of the clarifier showing the arrangement of the parts;

Fig. 2 is a broken plan view of the clarifier showing the location of the clarifier baskets;

Fig. 3 is a plan view of a portion of the clarifier showing a modified form of the launder;

Fig. 4 is a section taken on the line 4—4 of Fig. 3;

Fig. 5 is a sectional view of a modified form of the clarifier basket;

Like reference characters denote like parts in the several figures of the drawings.

Figure 1:
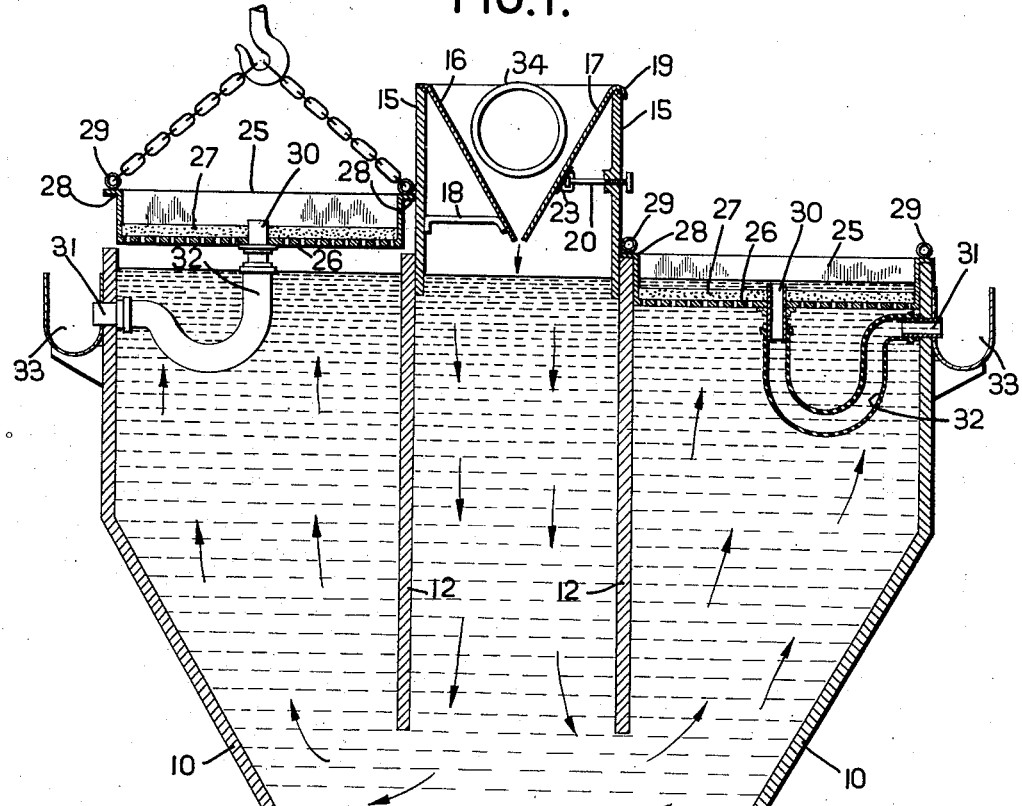

In the following desciption and in the claims parts will be identified by specific names for convenience, but they are intended to be as generic in their application to similar parts as the art will permit.

Referring to the drawings more in detail the invention is shown as applied to a clarifier tank having side walls 10, sludge hoppers 11 and longitudinally extending baffle plates 12, which project downwardly from the surface of the tank towards said sludge hoppers. Outlet pipes 13, having valves 14 incorporated therein, are secured in said sludge hoppers and provide for the removal of the thickened material or sludge therefrom.

A supply launder is mounted on frame sections 15 which are secured to baffles 12 in any suitable manner. Said launder includes a stationary side 16, and a movable side 17, by means of which the discharge opening may be controlled. Side 16 may be secured to frame 15 in any convenient manner, such as by brace 18 extending between said frame and the lower part of said side. Movable side 17 is provided with a hooked end 19 which extends over a cooperating surface on frame 15 and serves as a support for said side. An adjusting screw 20, shown more in detail in Fig. 4, is threaded through frame 15 into engagement with side 17 of the launder. Said screw may be attached to said side in any convenient manner to provide for the necessary movement therebetween. In the example illustrated, screw 20 is provided with a ball end 21 cooperating with an elongated socket 22 carried in bracket 23, which is secured to said side 17 in any convenient manner.

A plurality of clarifier baskets 25 are mounted on the sides of the launder between baffles 12 and walls 10 of the tank. Said baskets have perforated bottoms 26 which may be formed of any desired material such as a wire screen or bars. Said bottoms 26 are adapted to support the clarifying medium 27 and prevent discharge of said medium therethrough, while freely permitting upward flow of the liquid under treatment. The baskets are also provided with a flange 28 which is adapted to extend over baffles 12 and sides 10 for supporting the baskets in operative position at the top of said tank. Eyes 29 are secured in flange 28 to form a guide by means of which the baskets may be elevated out of contact with said tank and the contents thereof.

A discharge nozzle 30 is secured in the bottom 26 of basket 25 and is connected to pipe 31 by means of a flexible link or hose 32. Pipe 31 discharges into an overflow weir or launder 33 which is supported on the outside of walls 10 in any convenient manner.

The material under treatment is supplied to the launder 16, 17, through inlet pipe 34. The distribution of discharge from the launder is regulated by pivotally moving side 17 until the proper size of opening is obtained between sides 16 and 17. The material then passes downwardly between baffles 12 and, passing under said baffles, the liquid, with any unsettled solids, rises and passes through baskets 25, and the clarifying material contained therein. The liquid, after passing through the clarifying medium, is discharged free from solids, through hose 32 into the overflow weir 33 and may be utilized as desired.

Various types of clarifying mediums, such as sand, coke breeze, fuller's earth, and other well known materials, or mediums, may be used in accordance with the particular substance under treatment. Fuller's earth may be used for the demulsifying of oils. For certain substances a cloth or other screen may be used. Sand has been found suitable for the clarification of sewage.

The rate of flow is maintained comparatively slow in order to avoid unnecessary agitation of the liquid. A rate of 1 gallon per minute upward to 1 sq. ft. of clarifying medium has been found suitable for treating sewage. The coarse particles gradually settle into the sludge hopper out of the rising column of liquid and the finer particles coagulate across the bottom of the screen, building up in size until they are sufficiently heavy to drop off and settle into the sludge hopper, from which they may be removed through pipe 13.

With continued use, the holes in the screen and the pores of the sand gradually become filled and interfere with the clarifying operation. When this condition is reached the basket is raised in a manner shown at the left in Fig. 1 and the clarifying medium washed. The wash water flows back into the main body of water in the tank.

It is to be noted that when the basket is raised nozzle 30 is also raised and no water can flow into the overflow weir 33. The said weir is accordingly prevented from becoming polluted by liquid which has not passed through the clarifying medium.

When various substances are to be acted upon, it is at times desirable to utilize different clarifier substances, and supports of different size may be required. This is accomplished in the present invention as shown in Fig. 5 by providing bottom 26 of basket 25 with comparatively large perforations and employing a second screen 40 to support the clarifier material 27. Said screen may be provided with perforations of a suitable size to support said material and to permit free passage of the liquid therethrough.

In certain instances it may be desirable to differentially regulate the flow of liquid through the various parts of the supply launder. For this purpose the construction shown in Figs. 3 and 4 may be employed in which the movable side 17 is formed with a plurality of sections 41, each of which may be independently adjusted as desired. Flanges 42 are secured on the ends of sections 41 in contacting relationship to prevent flow of liquid therebetween, when said sections are adjusted in different elevations. Said flanges may be of any desired material, and preferably contact sufficiently tight to prevent substantial flow of liquid while permitting relative movement of the various sections. A separate adjusting screw 20 is provided for each of said sections as shown more in detail in Fig. 4.

Figure 7:
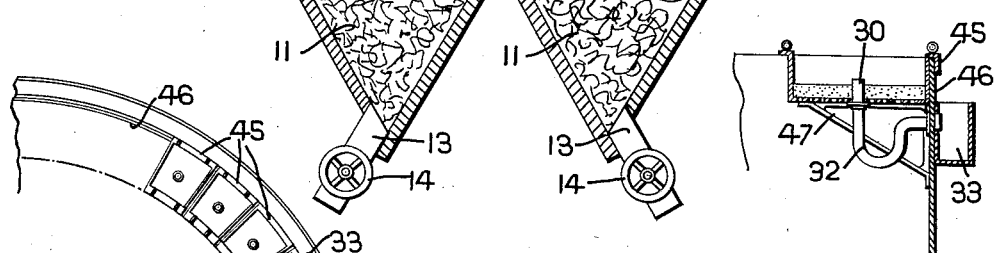
Fig. 7 is a section taken on the line 7—7 of Fig. 6.
Figure 6:
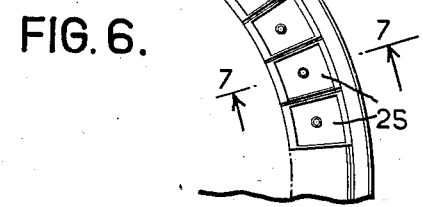
Fig. 6 is a broken plan view showing the arrangement of the baskets in a circular tank.

The invention may also be applied to a circular clarifier tank, as shown in Figs. 6 and 7. For this purpose baskets 25 may be formed with a hooked flange 45, which is adapted to engage the rim 46 of the tank for securing the basket in position. An additional bracing member 47 may be secured to said basket for more rigidly securing the same, if desired. Nozzle 30 and flexible hose 32 discharge into weir 33 in the same manner as pointed out above.

Discharge nozzle 30 has been shown as connected to pipe 31 by flexible hose which is capable of following the movement of the basket as the latter is raised. Various other connections might be employed, however, for discharging the clarifying material from the top of the basket into the overflow weir, but preventing passage of unclarified material when the basket is in raised position.

The type of clarifying material may be changed in accordance with the material being treated. By passing liquid upwardly through the clarifying medium said medium is prevented from packing and the tendency of the separated particles to become embodied therein is reduced to a minimum. Furthermore, the clarifying medium does not come in contact with all suspended matter inasmuch as the coarser particles settle of their own accord to the sludge hoppers and do not come in contact with the clarifier baskets. This speeds up the operation and permits the medium to be used for a longer period without cleaning. By arranging a plurality of clarifier baskets in the manner described, certain baskets may be raised and cleaned when necessary without interrupting the continuous operation of the process. During the washing operation the sand will clean itself of dirt and grease and the like as the particles are moved around among themselves by the force of the cleaning water.

The uniform introduction of the material from the launder permits a uniform settling of the particles in all parts of the clarifier and insures an efficient operation of all parts. It is to be noted that the path of current flow is of the same length in all parts of the clarifier, thus equalizing the clarification in all parts of the apparatus.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a clarifier, a plurality of movable baskets, a clarifying medium contained in said baskets, means for causing the liquid to pass upwardly through said medium whereby the particles collect on the bottom of said baskets and fall downwardly to the bottom of said clarifier, means for removing the clarified liquid from the top of said baskets and means for preventing discharge of unclarified material when said baskets are removed.

2. In a rectangular clarifier, a longitudinally extending supply launder, clarifying medium supported on opposite sides of said launder and means for passing liquid from said launder downwardly in said tank and upwardly through said medium.

3. In a rectangular clarifier, a longitudinally extending supply launder, clarifying medium supported on opposite sides of said launder, means for passing liquid from said launder downwardly in said tank and upwardly through said medium, and means for selectively rendering inoperative portions of said medium for cleaning purposes.

4. In a rectangular clarifier tank, a longitudinally extending supply launder, baskets secured on opposite sides thereof, said baskets being adapted to contain clarifying medium and means for selectively raising said baskets for cleaning purposes.

5. In combination with a clarifier tank, a supply launder extending thereacross and means for variably adjusting the rate of discharge from the various parts of said supply launder into said tank.

6. In combination with a clarifier, a basket containing a clarifying medium mounted therein, a discharge nozzle carried in said basket and extending above said medium, an overflow weir and means for connecting said discharge nozzle with said weir whereby the clarified liquid may be discharged from said basket into said weir.

7. In combination with a clarifier tank, a supply launder therefor comprising a two sided trough extending over said clarifier, said trough having a discharge opening therein and means for adjusting the size of said opening whereby the rate of flow from said trough to said clarifier may be controlled.

8. In combination with a clarifier, a supply tank therefor having a stationary side and a movable side, and means for adjusting said movable side for varying the discharge opening whereby the flow of material therefrom may be controlled.

9. In a clarifier, a pair of downwardly extending baffles in spaced parallel position, a framework supported from said baffles, a supply launder carried by said framework and having a pair of sides, and means for adjusting the position of one of said sides whereby the rate of discharge may be controlled.

10. In a clarifier, a pair of downwardly extending baffles in spaced parallel position, a framework supported from said baffles, a supply launder carried by said framework and having a pair of sides, one of said sides being hingedly secured to said framework, and means for pivotally adjusting said hinged side whereby its position with respect to the other of said sides may be varied.

11. In combination with a rectangular clarifier, a supply launder extending longitudinally thereof and substantially coextensive therewith, and means for discharging material from said launder to said clarifier.

12. In an elongated clarifier tank, a plurality of baskets of clarifying medium arranged along the sides thereof, means for supplying material to the central portion of said clarifier and means for adjusting the rate of flow of said material in the various portions thereof whereby an even flow may be maintained through each of said baskets.

13. In a clarifier, a plurality of baskets rigidly supported therein, means to selectively raise each of said baskets out of contact with the liquid being treated, a clarifying medium contained in said baskets, means for causing the liquid to pass continuously upwardly through said medium whereby the particles collect on the bottom of said baskets and fall downwardly to the bottom of said clarifier through the upward flowing liquid, a discharge opening for the clarified liquid located at the side of said clarifier below the level of the liquid being treated and means for removing clarified liquid from the top of each basket and discharging the same through said discharge opening, and means controlled by the positions of each basket to prevent discharge of unclarified material when the basket is elevated.

14. In a clarifier tank, a supply launder, baskets secured on opposite sides thereof and adapted to contain clarifying medium, means for selectively elevating said baskets for cleaning purposes, and means controlled by the position of each basket for preventing discharge of unclarified liquid when said basket has been elevated.

WILLIAM C. LAUGHLIN.